United States Patent
Fiedler

(10) Patent No.: US 9,979,550 B1
(45) Date of Patent: May 22, 2018

(54) METHODS OF FACILITATING PACKET-BASED CONNECTIONS

(71) Applicant: The Network Protocol Company, Inc., Santa Monica, CA (US)

(72) Inventor: Glenn Alexander Fiedler, Santa Monica, CA (US)

(73) Assignee: The Network Protocol Company, Inc., Santa Monica, CA (US)

( * ) Notice: Subject to any disclaimer, the term of this patent is extended or adjusted under 35 U.S.C. 154(b) by 0 days. days.

(21) Appl. No.: 15/656,454

(22) Filed: Jul. 21, 2017

Related U.S. Application Data

(60) Provisional application No. 62/462,224, filed on Feb. 22, 2017.

(51) Int. Cl.
| | |
|---|---|
| *H04L 29/06* | (2006.01) |
| *G06F 21/00* | (2013.01) |
| *H04L 9/32* | (2006.01) |
| *H04L 9/14* | (2006.01) |
| *H04L 9/30* | (2006.01) |
| *A63F 13/73* | (2014.01) |
| *H04L 29/08* | (2006.01) |
| *A63F 13/35* | (2014.01) |

(52) U.S. Cl.
CPC ............ *H04L 9/3247* (2013.01); *A63F 13/35* (2014.09); *A63F 13/73* (2014.09); *H04L 9/14* (2013.01); *H04L 9/30* (2013.01); *H04L 9/3226* (2013.01); *H04L 63/1458* (2013.01); *H04L 67/141* (2013.01); *H04L 67/146* (2013.01); *H04L 67/02* (2013.01); *H04L 67/42* (2013.01)

(58) Field of Classification Search
CPC ... H04L 9/3247; H04L 67/141; H04L 67/146; H04L 9/14; H04L 63/1458; H04L 9/3226; H04L 9/30; H04L 67/02; H04L 67/42; A63F 13/35; A63F 13/73

See application file for complete search history.

(56) References Cited

U.S. PATENT DOCUMENTS

| | | | |
|---|---|---|---|
| 9,433,862 B2* | 9/2016 | Bruno, Jr. ............... | G06F 12/00 |
| 2008/0209538 A1* | 8/2008 | Malakapalli ............ | H04L 63/18 726/12 |
| 2012/0270644 A1* | 10/2012 | Buhr ...................... | A63F 13/493 463/29 |
| 2012/0322546 A1* | 12/2012 | Lalumiere ............... | G07F 17/32 463/26 |
| 2013/0246575 A1* | 9/2013 | Giaretta .................. | H04L 41/00 709/218 |
| 2017/0289159 A1* | 10/2017 | Adrangi .................. | H04L 63/10 |
| 2018/0054410 A1* | 2/2018 | Bhagwan ................ | H04L 51/32 |

OTHER PUBLICATIONS https://en.wikipedia.org/wiki/WebRTC, last edited Jul. 17, 2017; downloaded Jul. 21, 2017.
https://en.wikipedia.org/wiki/QUIC, last edited Jul. 11, 2017; downloaded Jul. 21, 2017.
https://en.wikipedia.org/wiki/HTTP/2, last edited Jul. 15, 2017; downloaded Jul. 21, 2017.

* cited by examiner

*Primary Examiner* — Lisa C Lewis
(74) *Attorney, Agent, or Firm* — Sean Lynch

(57) ABSTRACT

Methods of facilitating communication between clients and servers are contemplated. Embodiments of the inventive subject matter make it possible for a client to establish a packet-based connection with a server by first authenticating with a web backend. This can enable, for example, a client to establish a packet-based connection with a server though a web browser.

12 Claims, 10 Drawing Sheets

METHODS OF FACILITATING PACKET-BASED CONNECTIONS

Figure 1:
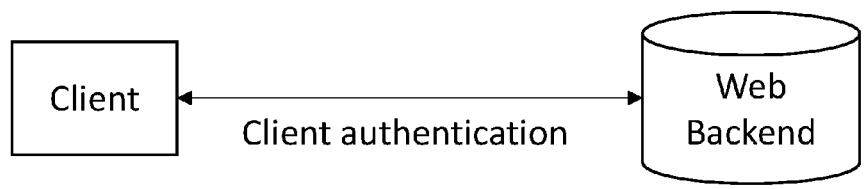

This application claims priority to application Ser. No. 62/462,224 entitled "Methods of Implementing UDP in Web Browsers," which was filed on Feb. 22, 2017.

FIELD OF THE INVENTION

The field of the invention is web browser technology.

BACKGROUND

The background description includes information that may be useful in understanding the present invention. It is not an admission that any of the information provided in this application is prior art or relevant to the presently claimed invention, or that any publication specifically or implicitly referenced is prior art.

Web browsers are built on top of HTTP, which is a stateless request/response protocol initially designed for serving static web pages. HTTP is built on top of TCP, a low-level protocol which guarantees data sent over the internet arrives reliably, and in the same order it was sent.

TCP is a reliable-ordered protocol, which means packets of data must be interpreted in the correct order. To deliver data reliably (and in order) while experiencing packet loss, it is necessary for TCP to hold more recent data in a queue while waiting for dropped packets to be resent. Otherwise, data would be delivered out of order. This is called "head of line blocking," and it creates problems for game developers who send time-series data such as player inputs and the state of objects in a game world. When time series data is sent over TCP, the most recent data is delayed while waiting for old data to be retransmitted. By the time the retransmitted data arrives, it is too old to be used.

HTTP has functioned well for many years, but recently websites have become more interactive and poorly suited to the HTTP request/response paradigm. Some have attempted to address these shortcomings with modern web protocols like WebSockets (a computer communications protocol that provides full-duplex communication channels over a single TCP connection), WebRTC (a free, open project that enables web browsers with Real-Time Communications (RTC) capabilities via simple JavaScript APIs), HTTP 2.0 (an improved HTTP protocol designed to decrease latency to improve page load speed in web browsers), and QUIC (a protocol similar to TCP+TLS+HTTP/2 except it is implemented on UDP).

WebSockets are an extension to the HTTP protocol, which enables bidirectional data exchange—an improvement over the traditional request/response pattern. Although bidirectional data exchange is a step in the right direction, WebSockets are implemented on top of TCP, and data is still subject to head of line blocking.

QUIC is an experimental protocol that supports multiple data streams, and it is built on top of UDP. QUIC is designed as replacement transport layer for HTTP. New data streams can be created implicitly by the client or server by increasing the channel ID. The channel concept implemented by QUIC has two key benefits: it avoids a connection handshake each time a new request is made, and it eliminates head of line blocking between unrelated data streams. But while head of line blocking is eliminated across unrelated data streams, it persists within each individual stream.

WebRTC is a collection of protocols that enable peer-to-peer communication between browsers for applications like audio and video streaming. WebRTC supports a data channel that can be configured in unreliable mode, providing a way to send and receive unreliable-unordered data from the browser. WebRTC includes STUN, ICE, and TURN support. STUN, ICE, and TURN are IETF standard protocols for negotiating traversing NATs when establishing peer-to-peer communication sessions. But within the game development community, there exists a trend away from peer-to-peer communication towards client/server communication for multiplayer games, and while WebRTC supports unreliable-unordered peer-to-peer data exchanged between browsers, it is difficult to use WebRTC in a client/server context.

Another solution to consider is to allow users send and receive UDP packets directly from the browser. This fails for several reasons. (1) Websites would be able to launch DDoS attacks by coordinating UDP packet floods from browsers. (2) New security holes would be created as JavaScript running in web pages could craft malicious UDP packets to probe the internals of corporate networks and report back over HTTPS. (3) UDP packets are not encrypted, so any data sent over these packets could be sniffed and read by an attacker, or even modified during transmission. And (4), there is no authentication, so a dedicated server reading packets sent from a browser would have to implement its own method to ensure that only valid clients can connect to it. Therefore, allowing JavaScript to create UDP sockets in the browser is a nonstarter.

At worst these new standards for web development do not provide adequate technological infrastructure to meet multiplayer game's needs, and, at best, they provide it in a form that is too complicated for game developers to use. Thus, there is still a need for a protocol that implements the ability to send and receive UDP packets in the browser.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

SUMMARY OF INVENTION

In one aspect of the inventive subject matter, a method of establishing a network connection between a client and a dedicated server to facilitate multiplayer gaming is contemplated. It is also contemplated that only authenticated clients may connect to a server, and packets exchanged between the client and server are encrypted and signed, so that they may not be read by third parties or modified in transit.

In some embodiments, the client is a traditional game client running in its own executable (e.g., a AAA game running on PC, Xbox or PlayStation). In other embodiments, a game client runs inside a web browser for browser based gaming.

The client authenticates with a web backend, using for example OAuth 2.0. Once authenticated, the game client sends a request to play to the web backend. The web backend determines a set of dedicated servers suitable for the client to connect to, and returns these to the client in the form of a connect token.

Connect tokens are short-lived cryptographic tokens that transfer client authentication with the web backend to the client connection to the server. In some embodiments, a server only allows connection clients with a valid connect token that has not expired, and has not already been used on that server. This ensures that clients must authenticate with the web backend and obtain a connect token in order to connect to a server.

In some embodiments, the connect token includes both public data (e.g., encryption keys for packets and an array of server addresses) and private data, where the private data is encrypted and signed via symmetric encryption using a shared private key, and portions of the public data are signed by the shared private key.

In other embodiments, the connect token includes both public data (e.g., encryption keys for packets and an array of server addresses) and private data. The private data can be encrypted and signed via asymmetric encryption using the private key of the web backend and the public key of the server, and portions of the public data are signed and encrypted by the private key of the web backend and the public key of the client.

In some embodiments, the client reads the connect token public data and uses this information to attempt connection to each server in turn, accepting connection with the first server that allows the client to connect.

Connection to a server is initiated by the client sending connection request packets to the server containing portions of the private and public connect token over an unreliable, packet-based network protocol, for example, UDP.

The server upon receiving a connection request packet ignores any connection requests that do not include a valid connect token, or that contain a connect token which has expired, or has already been used on that server.

A challenge-response protocol is implemented to disallow clients with spoofed IP addresses from connecting to the server. When receiving a connection request from a client, instead of immediately granting that client connection with the server, a connection challenge packet is sent to the client which includes a challenge token.

The challenge token includes data relevant to the network connection, and it is encrypted and signed with a random key that is generated when the server is started.

The client is only allowed to complete connection to the server only when it returns a challenge response packet to the server, containing the challenge token data from the connection challenge packet, proving that the client is able to receive data sent to the IP source address of its packets. The challenge response packet is intentionally smaller than the connection request packet, so the challenge-response protocol may not be used as part of a DDoS amplification attack.

In some embodiments, the client connection slot on the server enters into a connected but unconfirmed state after receiving a challenge response packet from the client, allowing the server to send connection payload packets to the client earlier than if it waited for the connection to be fully established.

Once a connection is established between a client and server, the client and server exchange can connection payload packets in both directions. In some embodiments, these packets are encrypted and signed with symmetric encryption using private keys included in the connect token private data.

BRIEF DESCRIPTIONS OF THE FIGURES

Figure 2:
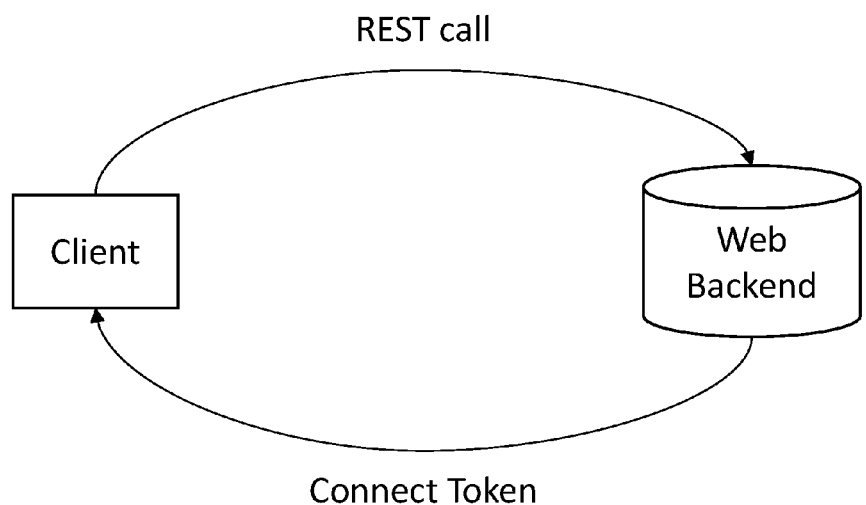
Figure 3:
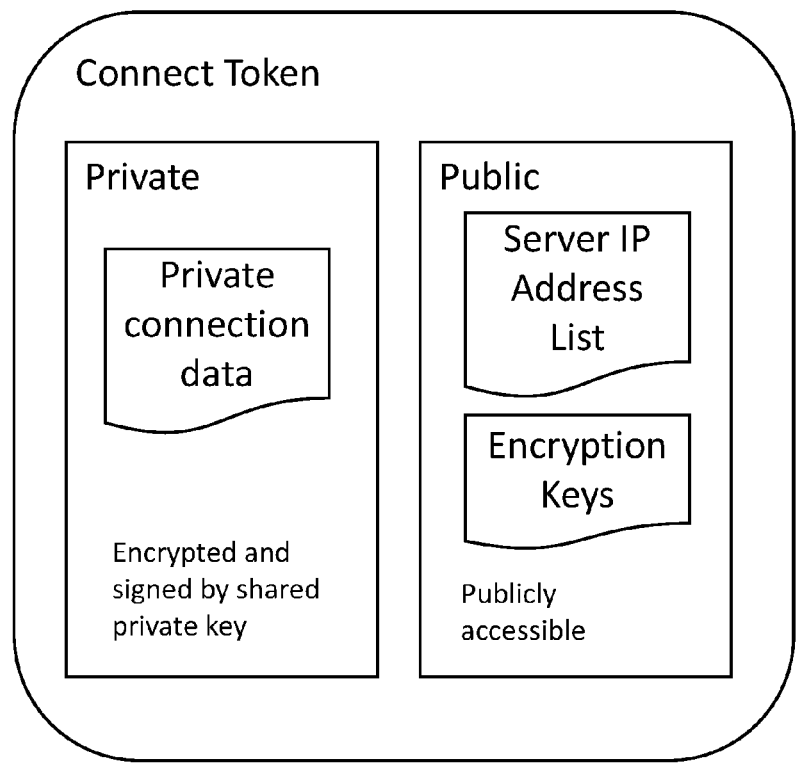
Figure 4:
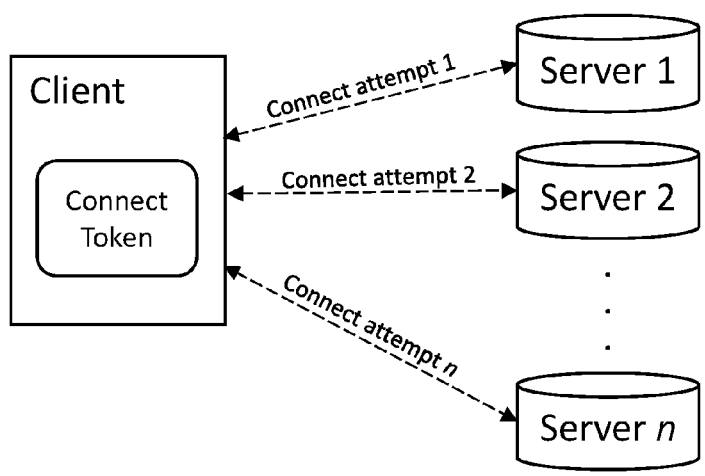
Figure 5:
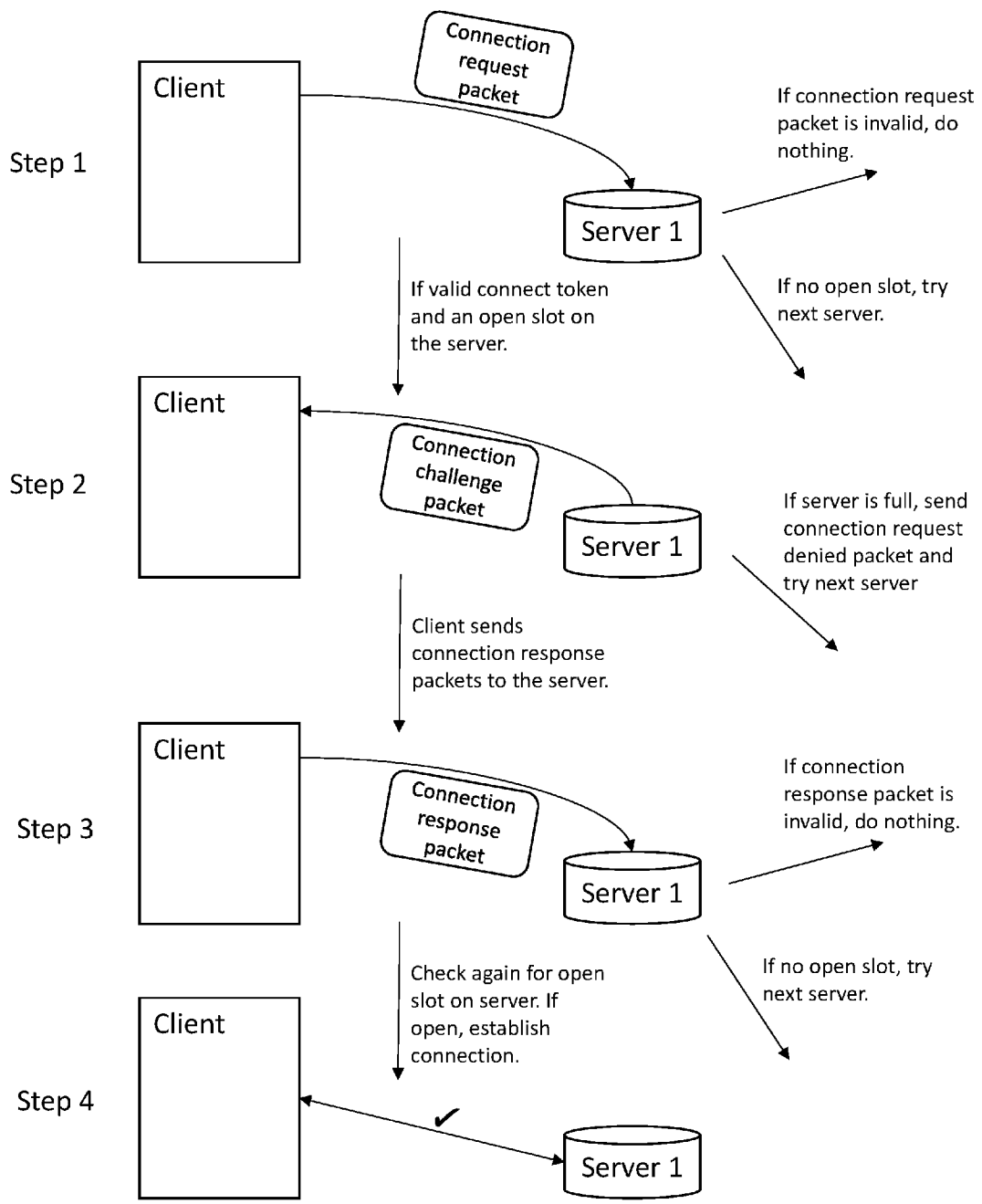
Figure 6:
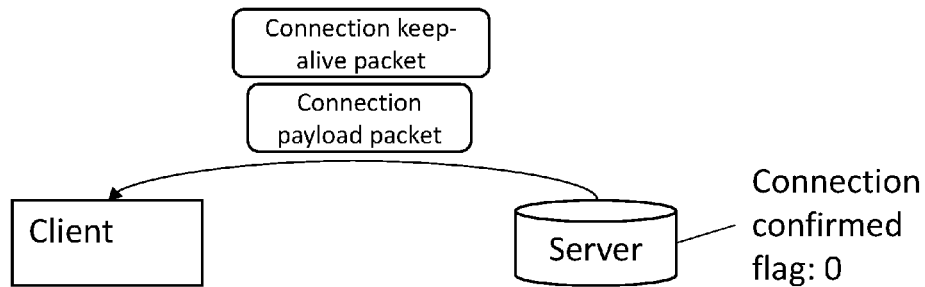
Figure 7:
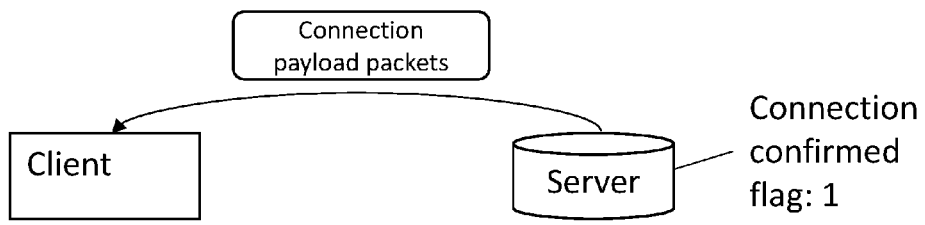
Figure 8A:
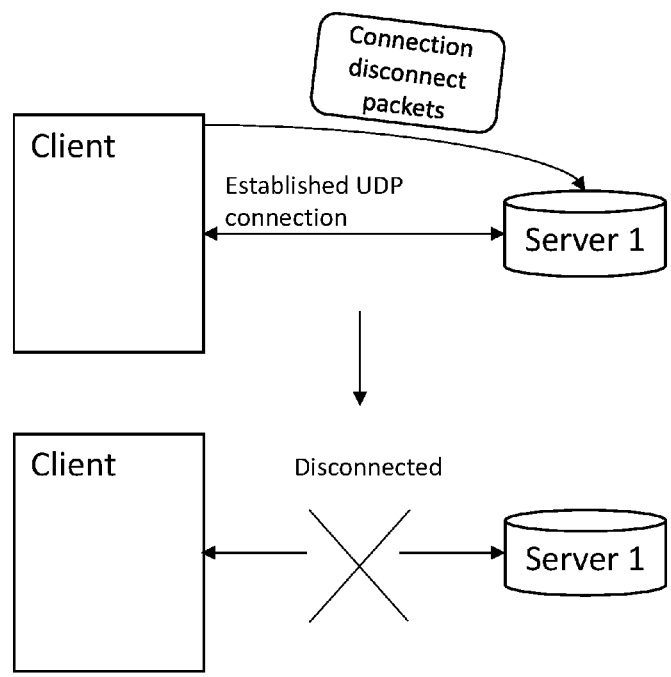
Figure 8B:
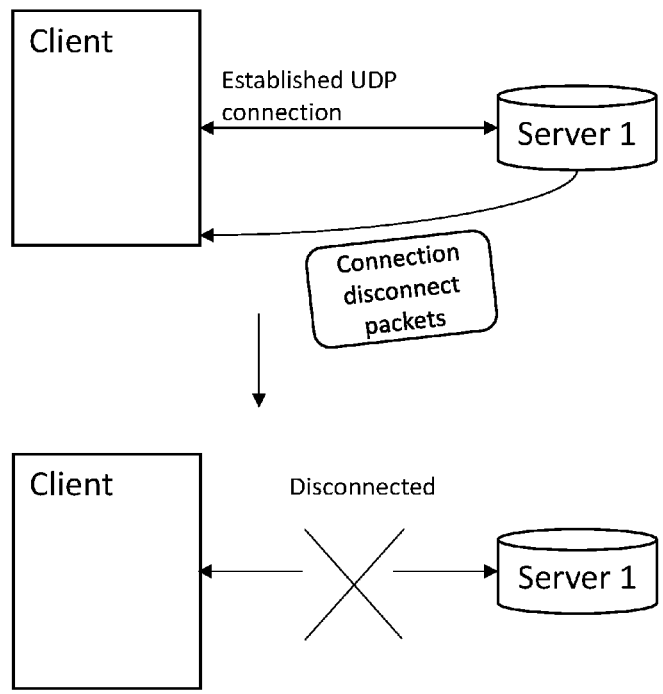
Figure 9:
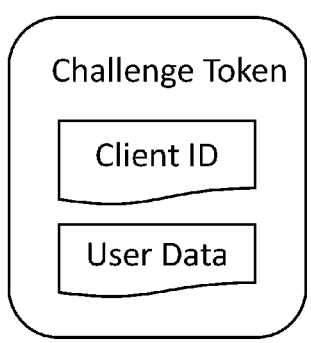
Figure 10:
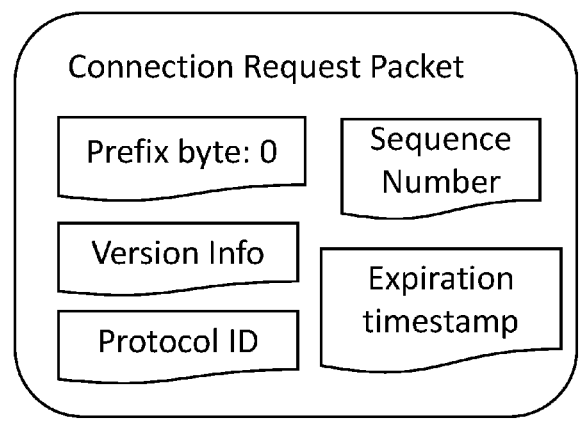
Figure 11:
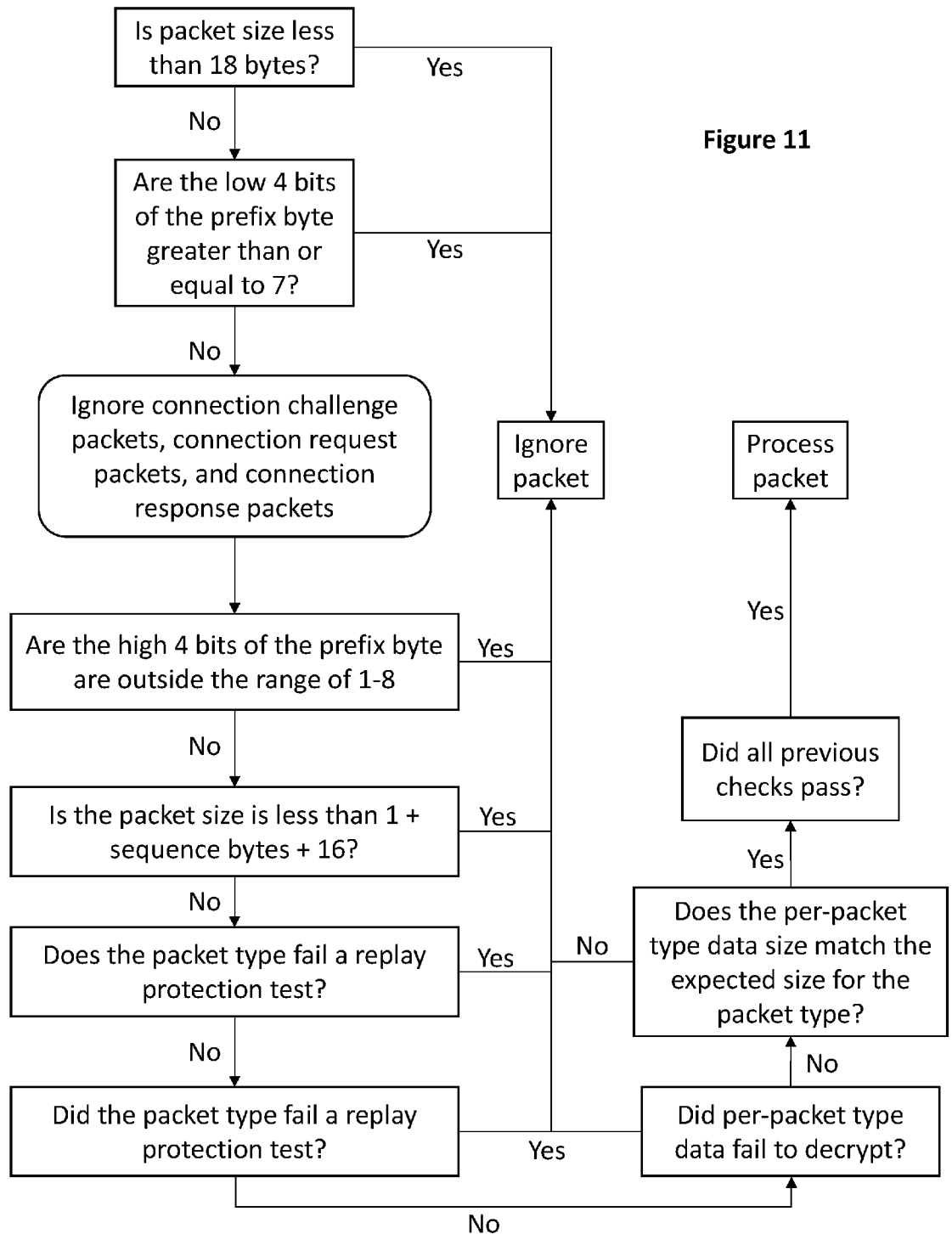
Figure 12:
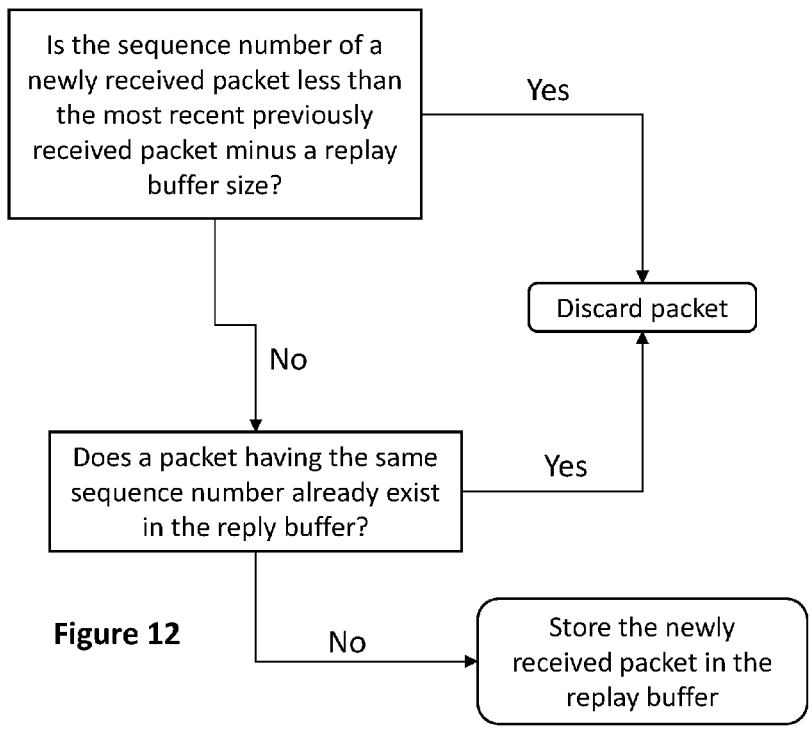
Figure 13:
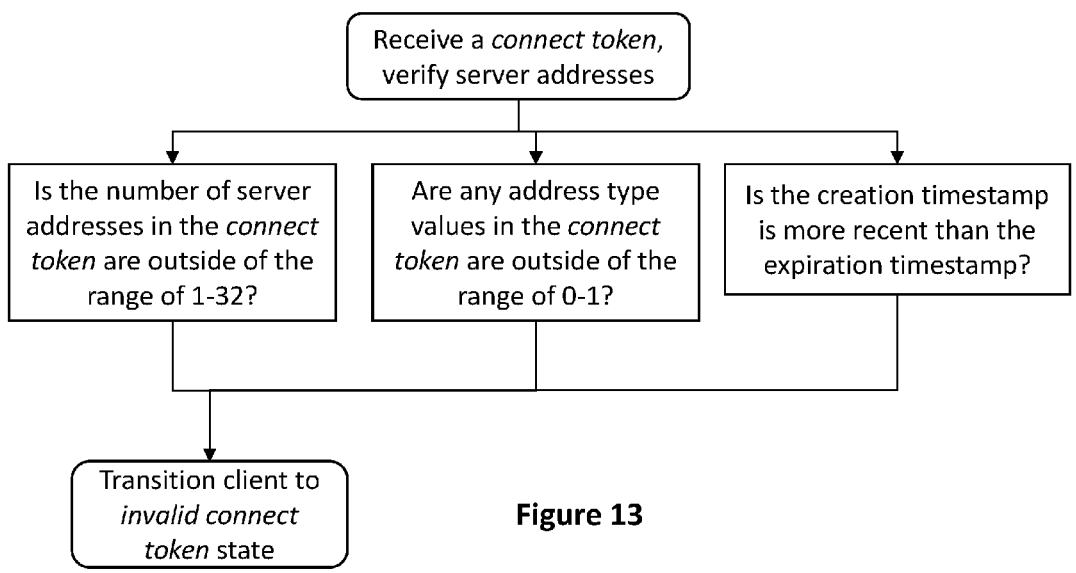
Figure 14:
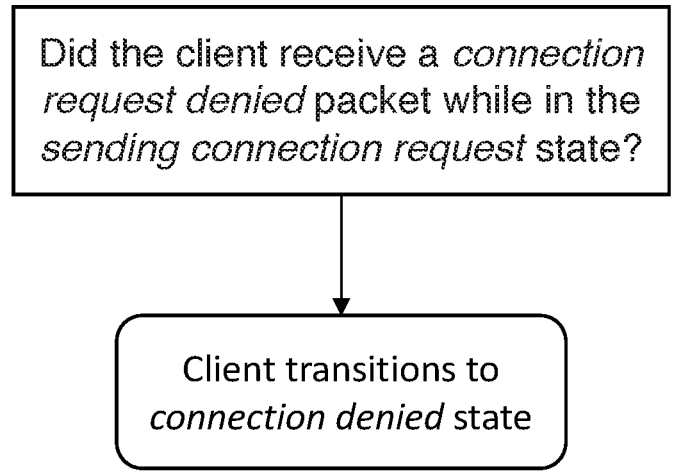
Figure 15:
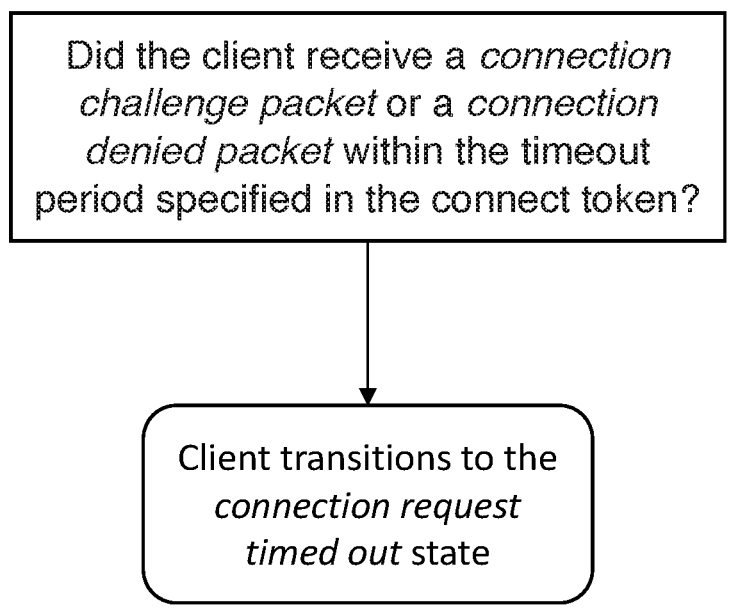
Figure 16:
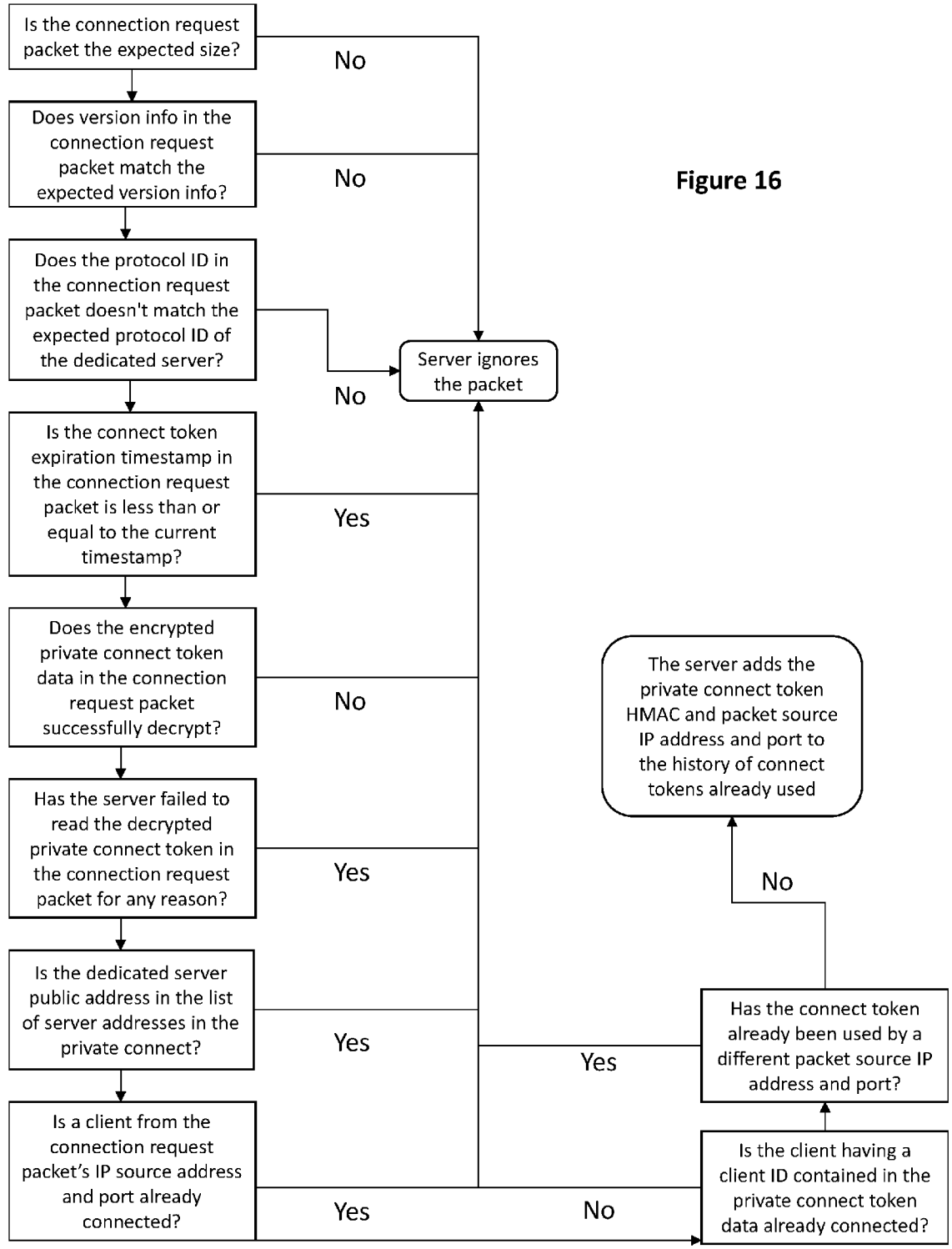
Figure 17:
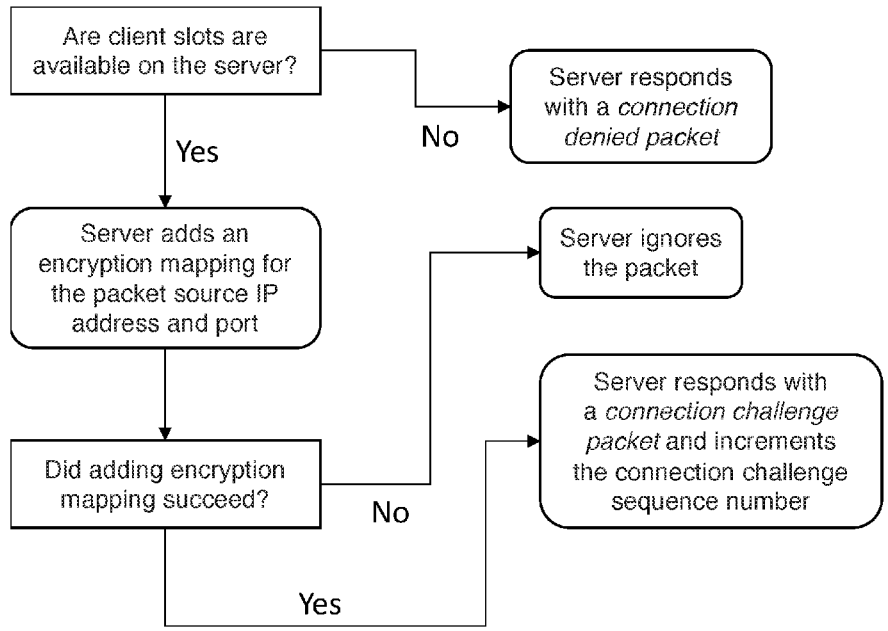
Figure 18:
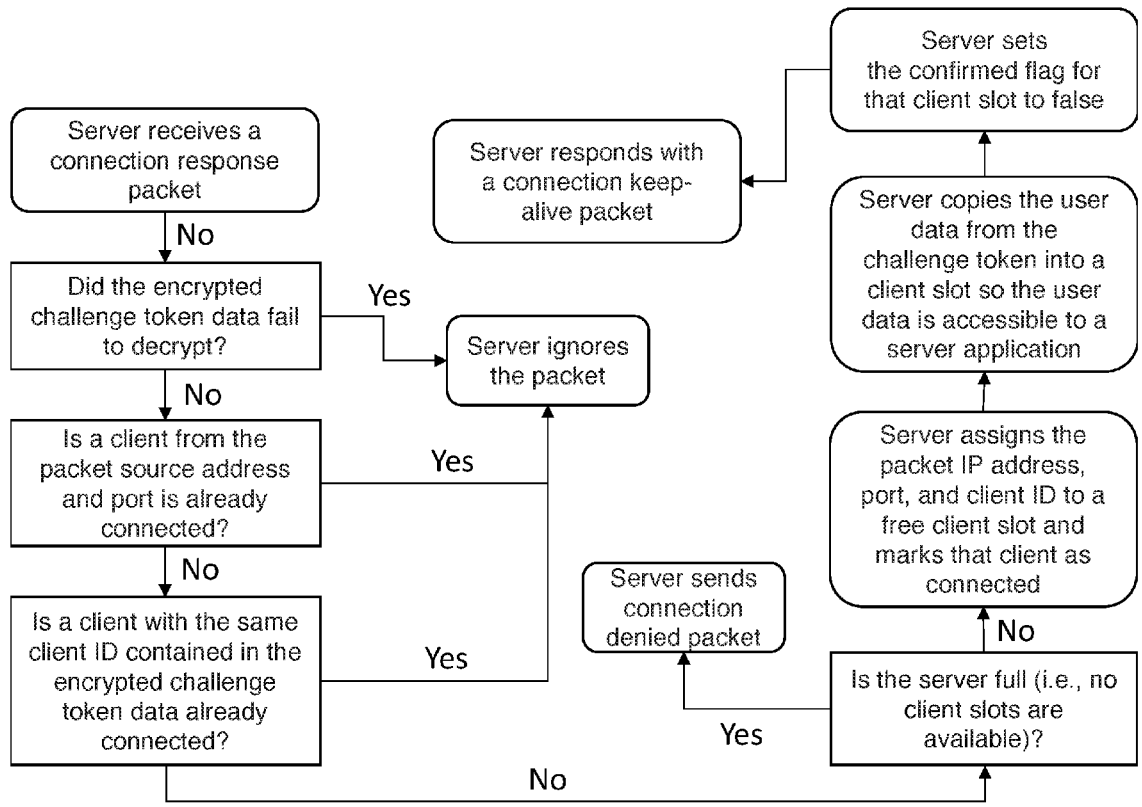

FIG. 1 shows a client authenticating with a web backend.
FIG. 2 shows a client communicating with a web backend after authenticating.
FIG. 3 shows a connect token.
FIG. 4 shows a client attempting to connect with several servers.
FIG. 5 shows different steps associated with establishing a connecting with a server.
FIG. 6 shows a server sending a connection keep-alive packet and a connection payload packet to a client.
FIG. 7 shows a server sending a connection payload packet to a client.
FIG. 8a illustrates a disconnection technique.
FIG. 8b shows another disconnection technique.
FIG. 9 shows a challenge token.
FIG. 10 shows a connection request packet.
FIG. 11 illustrates a method of reading an encrypted packet.
FIG. 12 illustrates a method of replay protection.
FIG. 13 illustrates a method of verifying connect token validity.
FIG. 14 illustrates how a client can behave when it receives a connection request denied packet while in the sending connection request state.
FIG. 15 illustrates how a client can behave when it receives neither a connection challenge packet nor a connection denied packet within the timeout period specified in a connect token.
FIG. 16 is a flowchart showing how a connection request packet is handled.
FIG. 17 is a flowchart showing how server slot availability is handled.
FIG. 18 is a flowchart showing how a connection response packet is handled.

DETAILED DESCRIPTION

The present invention relates to a network communication protocol. In one aspect of the inventive subject matter, a method of facilitating communication between a client and a server is contemplated. The method includes the steps of: establishing a connection between the client and the server, and encrypting and signing packets of data to be set over the connection. The method includes the additional step of authenticating the client (e.g., prior to establishing the connection).

At its core, a method of the inventive subject matter includes the following properties: it is connection-based, so it could not be used in DDoS attacks or to probe security holes; data transmissions are encrypted and signed so packets cannot be read or modified in transit; and it implements authentication so dedicated servers only accept connections from clients who are authenticated on the web backend.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed considering the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

A network protocol is contemplated that allows clients to securely connect to dedicated servers and communicate over UDP. The contemplated network protocol is connection oriented, and it encrypts and signs packets. It provides authentication support so that only authenticated clients can connect to dedicated servers. It is designed so that, for example, web-based games implemented using the network protocol can shunt players from a website to one or more dedicated server instances, each with some maximum number of players (e.g., up to 256 players).

In some embodiments of the inventive subject matter, a web backend performs authentication. When a client wants to, for example, play a game, that client will make a REST call to the web backend requesting a connect token. The web backend returns a connect token to the client over a secure channel (such as HTTPS, since the connect token contains public data that should not be vulnerable to inspection by unauthorized parties). The connect token is then used as a part of the UDP connection handshake between the client and the dedicated server.

Connect tokens are short lived and rely on a shared private key between the web backend and dedicated server instances. A benefit of the approach described in this application is that only authenticated clients can connect to dedicated servers. By focusing on dedicated servers, the need for ICE, STUN, and TURN is obviated. By implementing encryption, signing, and authentication with, for example, libsodium (a library for encryption, decryption, signatures, password hashing, and more), the complexity of a full implementation of Datagram Transport Layer Security (DTLS) is avoided, while still providing the same level of security.

In some embodiments of the inventive subject matter, a client first authenticates with a web backend using standard authentication techniques (e.g., OAuth or OAuth 2.0). This is demonstrated visually in FIG. 1. Once a client is authenticated, they can make a REST call to, for example, play a game. The REST call returns a connect token (e.g., a base64 encoded connect token) to that client over a secure encrypted channel, for example HTTPS, as seen in FIG. 2.

A connect token (shown in FIG. 3) of the inventive subject matter has two parts: (1) private data, encrypted and signed by the shared private key using an Authenticated Encryption with Associated Data (AEAD) primitive form, for example, libsodium that cannot be read, modified, or forged by the client; and (2) public data, that provides information the client needs to connect to a server (e.g., encryption keys for UDP packets and the list of server addresses to connect to, along with some other information corresponding to the 'associated data' portion of the AEAD). Because the connect token contains public data (which is not encrypted), it is necessary for it to be communicated to the client over a secure channel, such as HTTPS.

In some embodiments, instead of a connect token including a list of server addresses, an individual connect token is generated for each server that the client can connect to, in turn. In this situation, each individual connect token is encrypted such that only the server that it was generated for can read it through implementation of asymmetric cryptography. In other words, each server has a private key/public key pair, and the connect tokens generated for each server contain private data that is encrypted using the private key of the web backend and the public key of the server, and may be decrypted using the public key of the web backend and the private key of the server.

The web backend is, for example, a web server, that a client (e.g., a personal computer or other network enabled computing device) can communicate with via REST calls over HTTPS. The client can communicate using, for example, a browser, a game, or other software capable of network communication. The job of the web backend is to authenticate the user (e.g., sign the user in or verify the user's identity). Once a user is authenticated, for example, the web backend knows the identity of the user (e.g., the user is authenticated and associated with a 64-bit ID). With authentication completed by the web backend, a connect token is used to create a cryptographically secure way to transfer the authenticated session from the web backend to, for example, a dedicated server instance.

In the context of a game, for example, there could exist a web backend where all players (e.g., clients) sign in (e.g., are authenticated), and then afterwards request to play the game. In response to an authenticated client requesting to play, the web backend can then determine which dedicated servers have free slots and can apply additional logic (e.g., sending players to servers running the game mode the player requested or the version of the game that matches that client, etc.). The web backend gives a connect token back to the client. The token instructs the client to attempt to connect to a set of servers (e.g., server IP addresses) in a specific order and to connect to the first server that allows for the connection to be completed. Tokens of the inventive subject matter remain valid for only a finite duration of time (e.g., 1-5, 5-10, 10-15, 15-20, 20-30, 30-40, 40-50, 50-60, 60-90, 90-120, and 120-150 seconds), where the duration of time is sufficiently long for a client to successfully connect to one of the servers listed in the connect token. 30 seconds from time of creation of a connect token, for example, should be sufficient time for a client receiving the connect token to use that connect token to connect to a server.

In circumstances where many discrete connection requests are sent to a server (as in the example above), a set of servers are passed to the client in the connection token so that even if the web backend sees that a server has a free slot for a client to connect, it could be the case that a different client has already connected to that server and filled that free slot by the time the client has attempted to connect. Thus, passing a set of servers to the client to attempt to connect to alleviates the issue of missing an open slot and failing to connect to any server at all.

Once a client has a connect token, the client attempts to connect to the set of servers as seen in FIG. 4. The client passes the connect token over UDP to establish the connection. In embodiments of the inventive subject matter, servers will only allow clients to connect that have first requested a connect token. This process is depicted in FIG. 5.

Servers (e.g., dedicated server instances) can be machines running in data centers or in the cloud. In some embodiments, the connection measures described above ensures that each client that connects is actually, for example, a real, paying customer, or at least has been rate limited to ensure connection to only one server at a time. One advantage of the inventive subject matter is that servers do not need to implement any logic other than a token check (e.g., is the token valid for the server's IP address? is the token expired?). If the token is valid, the server accepts the client's connection.

It is contemplated that servers and the web backend of the inventive subject matter share a private key. The "private key" is a randomly generated key (e.g., a random string of characters) that is known to both the web backend and the dedicated server instances. The private key must not be known by the client, or the security model breaks down, and the client would be able to generate, decrypt and read connect tokens. This security model relies on the private key being private between the dedicated servers and the web backend.

In some embodiments of the inventive subject, the web backend and the servers do not share a private key. For example, each server can have a private and public key pair, and the web backend can have its own private and public key pair. This allows the web server to generate connect tokens encrypted and signed with the web backend private key, and the public key of the server that connect token corresponds to. This adds additional security. For example, if one server is compromised, it doesn't compromise the whole system based around a shared private key, and connect tokens may only be decrypted by the server they were generated for.

An advantage of methods of the inventive subject matter is that efforts at rate limiting (e.g., to prevent DDoS attacks) can be accomplished using traditional web server techniques (e.g., on the web backend), rather than having to run logic on each server (e.g., dedicated server instance) independently, because the only way to connect to the servers is to get a connect token (that, for example, exists only for a duration of time) from the web backend first.

As mentioned above, a client receives the connect token which brings with it a set of server IP addresses that the client can attempt to connect to (e.g., in a particular order). While it is contemplated that the set of server IP addresses could include only a single server IP address, in some embodiments, the set includes multiple server IP addresses in case the first server is filled by the time the client attempts to connect to it. In an embodiment where the connect token is encrypted and signed with asymmetric encryption primitives (e.g., private/public key pairs), this set of server IP addresses is no longer required because the connect token may only be decrypted by the server it was generated for.

When a client is connecting to a server according to the inventive subject matter, the client sends a connection request packet repeatedly over UDP, as seen in Step 1 of FIG. 5. This packet can contain all or some subset of: the private connect token data, additional data for the AEAD such as the version information, protocol ID (e.g., a unique 64-bit number), expiration timestamp for the connect token, and the sequence number for the AEAD primitive.

When the server receives a connection request over UDP, it checks that the contents of the packet are valid using, for example, the AEAD primitive. If any of the public data in the connection request packet is modified, the signature check will fail. This prevents clients from modifying, for example, the expiration timestamp for a connect token, while also reducing rejection time for expired tokens.

If the private connect token data and the corresponding associated data for the AEAD included in the connection request packet are valid, the private connect token data included in the connection request packet is decrypted. As mentioned above, the private connect token data contains a list of dedicated servers (e.g., server IP addresses) that the connect token is valid for, which stops malicious clients going wide with one connect token and using it to connect to all available dedicated servers.

In some embodiments, the server also checks if the connect token has already been used by searching a short history of connect token authentication codes (e.g., keyed-hash message authentication codes (HMACs)), and ignores the connection request if a match is found. This prevents one connect token from being used to connect multiple clients to the same server.

The server can also enforce a variety of connection rules. For example, only one client with a given IP address could be allowed to be connected at any time, and only one client by unique client ID (e.g., a 64-bit integer that uniquely identifies a client that has been authenticated by the web backend) could be allowed to be connected at any time.

If the connect token has not expired, it decrypts successfully, the dedicated server's public IP is in the list of server addresses (e.g., in an embodiment that uses a shared private key), and any other checks pass, the dedicated server sets up a mapping between the client IP address and the encryption keys contained in the private connect token data. All packets exchanged between the client and server from this point are encrypted using these keys. This encryption mapping expires if no UDP packets are received from the client IP address for a duration of time (e.g., 5 seconds).

Next, the server checks if there is room for the client to connect to the server. Each server supports some maximum number of clients (e.g., a 64-player game has 64 slots for clients to connect to). If the server is full, it responds with a connection request denied packet, as shown in Step 2 of FIG. 5. This lets the client know to move on to the next server in the list of servers contained in the connect token when a server is full. If there is room for the client to connect to the server, the server stores the address and HMAC for the connect token for that client as a potential client. The server then responds with a connection challenge packet, as shown in Step 2 of FIG. 5, which contains a challenge token that contains some data relevant to that potential client connection encrypted with a random key rolled when the server is started. This avoids storing large blocks of data on the server for each potential client, by storing this data in the encrypted challenge token data instead.

The key randomization for encrypted challenge tokens ensures there is not a security problem when the same sequence number is used to encrypt challenge tokens across multiple servers. This is necessary because the servers do not coordinate with each other. Moreover, the connection challenge packet is significantly smaller than the connection request packet by design. This eliminates the possibility of the protocol being used as part of a DDoS amplification attack.

The client receives the connection challenge packet over UDP and switches to a state where it sends connection response packets to the server, as shown in Step 3 of FIG. 5. Connection response packets reflect a challenge token back to a server, establishing that a client can receive packets on a source IP address it claims to be sending packets from. This stops clients with spoofed packet source addresses from connecting to the server.

When the server receives a connection response packet it looks for a matching pending client entry, and if one exists, it searches once again for a free slot for the client to connect to, as shown in Step 3 of FIG. 5. After a server receives a connection response packet and assigns the client to a slot, the server sets that client slot into an "unconfirmed" state, even though that client is considered logically connected from the server point of view. If no free slot exists, it replies with a connection request denied packet since there may have been a slot free when the connection request was first received that is no longer available. If the connection response packet does not correspond to any valid pending client entry on the server, it is ignored.

In some embodiments, the server assigns the client to a free slot and replies with a connection keep-alive packet, which tells the client which slot it was assigned on the server (e.g., a client index). In multiplayer games, for example, a client index is typically used to identify clients connected to a server. For example, clients 0, 1, 2, and 3 in a 4-player game correspond to players 1, 2, 3 and 4.

Once a server assigns a client to a free slot, the server considers the client connected and can send connection payload packets to that client over a client-server connection, as shown in Step 4 of FIG. 5. These packets wrap game specific data and are delivered unreliable-ordered. But since the client needs to first receive a connection keep-alive before it knows its client index and can consider itself to be fully connected, the server tracks on a per-client slot basis whether that client is confirmed.

A connection confirmed flag per-client is initially set to "false," and it flips true once the server has received a connection keep-alive packet or connection payload packet from that client. In some embodiments, until a client is confirmed, each time a connection payload packet is sent from a server to a client, the connection payload packet is preceded by a connection keep-alive packet as seen in FIG. 6. This ensures the client is statistically likely to know its client index (which is included in connection keep-alive packets) and be fully connected prior to receiving the first connection payload packet sent from the server (as seen in FIG. 7), minimizing the number of connection establishment round-trips.

Below follows an example of packet exchange leading to client confirmation. (1) A server marks a client as fully connected when receiving valid connection response packet. (2) The server immediately sends back a connection keep-alive packet in response. (3) The server sets the connection confirmed flag for that client to false. (4) Game code running on the server may now send connection payload packets at any rate. But if the server does not send connection payload packets for some duration of time (e.g., 0.1 s), the server generates and sends connection keep-alive packets at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges) in the absence of connection payload packets being sent. For each connection payload packet the server sends under these conditions, the server also sends a connection keep-alive packet in front of it for non-confirmed clients (as shown in, for example, FIG. 6). (5) The client receives the connection keep-alive packet, marks itself as fully connected, and stores the client index contained in the connection keep alive packet. (6) The client may now send connection payload packets back to the server at any rate, but if no connection payload packets are sent for a duration of time (e.g., 0.1 s), the client automatically generates connection keep-alive packets to send to the server at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges) in the absence of connection payload packets being sent. (7) The server receives a connection keep-alive or a connection payload packet from the client. (8) the server marks that client as "confirmed." (9) The server ceases to send a connection keep-alive packet in front of each connection payload packet sent to the client. And finally (10), with both client and server fully connected and confirmed, bidirectional connection payload packets can be exchanged at whatever rate an application (e.g., a game) requires. On both the server side and the client side, if no connection payload packets are sent for a duration of time (e.g., 0.1 s), the side (i.e., client or server) that has not sent a connection payload packet will then generate and send connection keep-alive packets at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges) in the absence of connection payload packets being sent.

After establishing a client-server connection, UDP packets can be exchanged bidirectionally. Typical game protocols, for example, send player inputs from a client to a server at a high rate (e.g., 60 Hz) and world-state information from the server to client at a lower rate (e.g., 20 Hz, but in some instances 30 Hz, 40 Hz, or 60 Hz).

In some embodiments, if the server or client fail to exchange a steady stream of packets, connection keep-alive packets are automatically generated (by one or both of the server and client) to prevent the connection from timing out. A timeout occurs if no packets are received from either side of the connection for an amount of time (e.g., 5-10 seconds).

If either side of the connection wishes to cleanly disconnect, several connection disconnect packets are transmitted redundantly, increasing the chance that at least one of the connection disconnect packets reaches its destination even under packet loss. This ensures a clean and rapid disconnection (e.g., without waiting for a time out). In one disconnection example shown in FIG. 8*a*, a client initiates a clean disconnect, where the client sends disconnect packets to the server so that the server does not need to wait for a timeout to occur. In another disconnection example shown in FIG. 8*b*, a server initiates a clean disconnect, where the server sends disconnect packets to the client, so the client does not need to wait for a timeout.

An implementation of the inventive subject matter described in this application based around shared private key has been developed and entitled netcode.io. The following discussion is related to the netcode.io implementation. Any reference to netcode.io is a reference to the inventive subject matter. Inventive features from this point forward can be incorporated into inventive features described above in any manner.

Netcode.io is a binary protocol. All data is written in little-endian byte order unless otherwise specified. This applies not only to token and packet data, but also to sequence numbers converted to byte array nonce values, and associated data passed in to AEAD encryption primitives.

There are three main components in a netcode.io-based architecture: (1) the web backend, (2) dedicated servers, and (3) clients. These entities are shown in at least FIGS. 1, 2, and 4. The web backend can be a typical web server (e.g., nginx), which authenticates clients and provides a REST API. The term "web server" can refer to any computer system that processes requests via HTTP. It can refer to an entire system, or specifically to software that accepts and supervises HTTP requests.

Clients are endpoints running the netcode.io protocol that can connect to dedicated server instances. Dedicated servers are instances of the server-side portion of a game or application running in data centers or a cloud.

For a client to connect to a dedicated server using netcode.io, a sequence of operations must occur: (1) a client authenticates with the web backend, as shown in FIG. 1; (2) the authenticated client requests to play a game via REST call to the web backend, as shown in FIG. 2; (3) the web backend generates a connect token, shown in FIG. 2, and returns it to that client over HTTPS; (4) the client uses the connect token, the contents of which are shown in FIG. 3, to establish a connection with a dedicated server over UDP; (5) the dedicated server runs logic to ensure that only clients with a valid connect token can connect to it; and (6) once a connection is established, the client and server exchange encrypted and signed UDP packets, as shown in FIG. 5.

A connect token ensures that only authenticated clients can connect to dedicated servers. As shown in FIG. 3, the connect token has two parts: public and private. The private data is encrypted and signed with a private key shared between the web backend and dedicated server instances. Portions of the public data are signed with the shared private using an encryption primitive called AEAD (authenticated encryption with associated data), such that they may be read, but not modified without breaking the signature. Connect tokens are variably sized, but for simplicity they are written to a fixed size buffer of 1024 bytes. Unused bytes are zero-padded.

Encryption of the private connect token data in the netcode.io implementation is performed with the libsodium AEAD primitive crypto_aead_chacha20poly1305 ietf_encrypt with binary data representing version info (e.g., "NETCODE 1.00" ASCII with null terminator), protocol ID (e.g., a 64-bit value unique to a game/application), and expiration timestamp (e.g., a 64-bit Unix timestamp defining when the connect token expires) included as the associated data. The nonce (e.g., an arbitrary number used only once in a cryptographic communication) used for encryption is a 64-bit sequence number that starts at zero and increases with each connect token generated. The sequence number is extended by padding high bits with zero to create a 96-bit nonce.

Encryption is performed on the first 1008 bytes in the buffer, leaving the last 16 bytes to store the HMAC. Thus, the encrypted portion of the private connect token uses 1008 bytes while the HMAC of the encrypted private connect token uses 16 bytes for a total of 1024 bytes. After encryption, this data is referred to as the encrypted private connect token data.

Together the public data and private data form a connect token. Thus, a connect token includes: (1) version info (13 bytes) (e.g., "NETCODE 1.00" ASCII with null terminator); (2) a protocol ID (uint64) (e.g., a 64-bit value unique to a game/application); (3) a timestamp indicating when the connect token was created (uint64) (e.g., a 64-bit Unix timestamp indicating when a connect token was created); (4) an expiration timestamp (uint64) (e.g., a 64-bit Unix timestamp when this connect token expires); (5) a connect token sequence (uint64); (6) encrypted private connect token data (1024 bytes); (7) dedicated server addresses and ports (uint32) (e.g., between 1 and 32 server addresses and ports); (8) a client to server key (32 bytes); (9) a server to client key (32 bytes); and (10) a timeout time (uint32) (e.g., a number of seconds with no packets before a client times out, including: 1-5 seconds, 5-10 seconds, and 10-15 seconds). Any unused bytes in a connect token, up to 2048 bytes, are set to zeroes.

Challenge tokens, shown in FIG. 9, are used to stop clients with spoofed IP packet source addresses from connecting to dedicated servers. Before encryption, challenge tokens include: (1) a client ID (uint64) and (2) user data (256 bytes). Any unused bytes in a challenge token, up to 300 bytes, are set to zeroes.

Challenge token data is encrypted using, for example, the libsodium AEAD primitive crypto_aead_chacha20poly1305_ietf_encrypt with no associated data, a random key generated when the dedicated server starts, and a sequence number that starts at zero and increases with each challenge token generated). The sequence number is extended by padding high bits with zero to create a 96-bit nonce.

Encryption is performed on the first 284 bytes of the challenge token, leaving the last 16 bytes store the HMAC of the encrypted buffer, which is referred to as the encrypted challenge token data.

The netcode.io implementation uses the following packets: (1) a connection request packet; (2) a connection denied packet; (3) a connection challenge packet; (4) a connection response packet; (5) a connection keep alive packet; (6) a connection payload packet; and (7) a connection disconnect packet.

Connection request packets, shown in FIG. 10, are not encrypted, and in the netcode.io implementation they include several components: (1) 0 (uint8) (a prefix byte of zero); (2) version info (e.g., 13 bytes containing version information) (e.g., "NETCODE 1.00" ASCII with null terminator); (3) a protocol ID (8 bytes); (4) a connect token expiration timestamp (8 bytes); (5) a connect token sequence number (8 bytes); (6) encrypted private connect token data (1024 bytes). All other packet types are encrypted.

Before encryption, packets that are to be encrypted (e.g., connection denied packets, connection challenge packets, connection response packets, connection keep alive packets, connection payload packets, and connection disconnect packets) have the following format: (1) prefix byte (uint8) (e.g., a non-zero prefix byte where the low 4 bits of the prefix byte contain the packet type and high 4 bits contain the number of bytes for the sequence number in the range of 1-8); (2) sequence number (e.g., variable length 1-8 bytes that is encoded by omitting high zero bytes); (3) per-packet type data (e.g., variable length according to packet type).

To give an example of a sequence number that is encoded by omitting high zero bytes, a sequence number of 1000 is 0x000003E8 and requires only two bytes to send its value. Therefore, the high 4 bits of the prefix byte are set to 2 and the sequence data written to the packet is 0xE8, 0x03. The sequence number bytes are reversed when written to the packet.

As mentioned above, after the sequence number comes the per-packet type data. Per-packet type data can include: (1) a connection denied packet (e.g., no data); (2) a connection challenge packet (e.g., a challenge token sequence (uint64) and encrypted challenge token data (300 bytes)); (3) a connection response packet (e.g., a challenge token sequence (uint64) and encrypted challenge token data (300 bytes)); (4) a connection keep-alive packet (e.g., a client index (uint32) and max clients (uint32)); (5) a connection payload packet (e.g., payload data (1 to 1200 bytes)); and (6) a connection disconnect packet (e.g., no data).

The per-packet type data is encrypted. Encryption in the netcode.io implementation is accomplished using the libsodium AEAD primitive crypto_aead_chacha20poly1305_ietf_encrypt with the following binary data as the associated data: (1) version info (13 bytes) (e.g., "NETCODE 1.00" ASCII with null terminator); (2) a protocol ID (uint64) (e.g., 64-bit value unique to a game or application; and (3) a prefix byte (uint8) (e.g., a prefix byte in packet that stops an attacker from modifying the packet type).

The packet sequence number is extended by padding high bits with zero to create a 96-bit nonce. Packets sent from client to server are encrypted with the client to server key in the connect token. Packets sent from server to client are encrypted using the server to client key in the connect token for that client.

Post encryption, encrypted packet types (e.g., all packets except the connection request packets) have the following format: (1) a prefix byte (uint8) (e.g., a non-zero prefix byte); (2) a sequence number (e.g., a number having a variable length between 1-8 bytes); (3) encrypted per-packet type data, which has variable length according to packet type; and (4) an HMAC of encrypted per-packet type data (e.g., 16 bytes).

Reading an encrypted packet in the netcode.io implementation requires completing several steps in sequence, as shown in FIG. 11. First, if the packet size is less than 18 bytes then it is too small to possibly be valid, and the packet is ignored. Next, if the low 4 bits of the prefix byte are greater than or equal to 7, the packet type is invalid, and the packet is ignored. Next, the server ignores connection challenge packets. Next, the client ignores connection request packets and connection response packets. Next, if the high 4 bits of the prefix byte (e.g., sequence bytes) are outside the range of 1-8, the packet is ignored. Next, if the packet size is less than 1+sequence bytes+16, the packet is invalid and the packet is ignored. Next, if the packet type fails a replay protection test (discussed in more detail below), the packet is ignored. Next, if the per-packet type data fails to decrypt, the packet is ignored. Next, if the per-packet type data size does not match the expected size for the packet type, the packet is ignored. Expected sizes for each type of packet are as follows: 0 bytes for a connection denied packet; 308 bytes for a connection challenge packet; 308 bytes for a connection response packet 8 bytes for a connection keep-alive packet from 1 to 1200 bytes for a connection payload packet and 0 bytes for a connection disconnect packet. Finally, if all the above checks pass, the packet is processed.

Replay protection, mentioned briefly in the preceding paragraph, stops an attacker from recording a valid packet and replaying it back later to break the protocol. To enable replay protection, netcode.io implements several measures. For example, encrypted packets are sent with 64-bit sequence numbers that start at zero and increase with each packet sent. Sequence numbers can be included in the packet header and can be read by the receiver of a packet prior to decryption. Moreover, sequence numbers can be used as the nonce for packet encryption, so any modification to the sequence number fails the encryption signature check.

Replay protection, as shown in FIG. 12, operates as follows. First, packets are received and stored in a replay buffer having a set replay buffer size. The replay buffer size determines a quantity of packets that can be stored in the replay buffer (e.g., 64-128, 128-256, 256-512, 512-1028 packets). Replay buffer size is implementation specific. In some embodiments, a few seconds worth of packets at a typical send rate (20-60 Hz) is supported. For example, a replay buffer size of 256 entries per-client should be sufficient for most applications. Each packet received has an associated sequence number. Any packet having a sequence number that is older than the most recent sequence number received (e.g., received with a packet), minus the replay buffer size, is discarded on the receiver side.

For example, if a replay buffer size is 100, and the most recent packet received has a sequence number of 600, a packet having a sequence number of 499 or less (i.e., 1 less than 600 minus 100) would be discarded. When a new packet arrives that has a more recent sequence number than the previously most recent sequence number received, the sequence number associated with the new packet is updated on the receiver side and the new packet is accepted. If a packet arrives that is within replay buffer size of the most recent sequence number, it is accepted only if its sequence number has not already been received. If a packet is received having a sequence number that has already been received, that packet is ignored.

Replay protection can be applied to the following packet types on both the client-side and the server-side: (1) connection keep alive packets, (2) connection payload packets, and (3) connection disconnect packets.

In the netcode.io implementation, the client can indicate the following states (in the format of "state (state code)," where negative state codes indicate errors and a zero state code indicates disconnection): connect token expired (−6); invalid connect token (−5); connection timed out (−4); connection response timed out (−3); connection request timed out (−2); connection denied (−1); disconnected (0); sending connection request (1); sending connection response (2); connected (3).

When a client wants to connect to a server, it requests a connect token (FIG. 3) from the web backend, as shown in FIG. 2. Once the client has obtained a connect token, its goal is to establish a connection to one of the server addresses in the connect token, as shown in FIG. 4. To begin this process, it transitions to sending connection request with the first server address in the connect token.

Before doing this, the client verifies connect token validity, as shown in FIG. 13. For example, if the number of server addresses in the connect token are outside of the range of 1-32, if any address type values in the connect token are outside of the range of 0-1, or if a creation timestamp is more recent than an expiration timestamp, then the client transitions to the invalid connect token state.

As shown in Step 1 of FIG. 5, while in the sending connection request state, the client sends connection request packets to the server at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges). When the client receives a connection challenge packet from the server as shown in Step 2 of FIG. 5, it stores the challenge token data and transitions to the sending challenge response state.

All other transitions from the sending connection request state are failure cases. In these failure cases, the client attempts to connect to the next server address in the connect token (e.g., transitioning to the sending connection request state with the next server address in the connect token, as illustrated by FIG. 2). Alternatively, if there are no additional server addresses to connect to, the client transitions to the appropriate error state as described below.

If a client receives a connection request denied packet while in the sending connection request state as shown in FIG. 14, the client transitions to the connection denied state. If a client receives neither a connection challenge packet nor a connection denied packet within the timeout period specified in the connect token as shown in FIG. 15, the client transitions to connection request timed out.

While a client is in the sending challenge response state, the client sends challenge response packets to the server at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges). When the client receives a connection keep-alive packet from the server, it stores the client index and maximum number of clients in the packet (e.g., the "connected" state in the client state machine), and transitions to connected. Any connection payload packets received prior to the client transitioning to the connected state are discarded.

If the connect token expires (e.g., if the entire client connection process-which can span across multiple server addresses-takes long enough that the connect token expires before successfully connecting to a server), the client transitions to the connect token expired state. The length of time until expiration can be determined by subtracting the connect token's creation timestamp from the connect token's expiration timestamp.

While in the connected state, the client buffers connection payload packets received from the server so their payload data can be delivered to the client application as netcode.io packets. Also, while in the connected state, the client application can send connection payload packets to the server. In the absence of connection payload packets sent by a client, the client generates and sends connection keep-alive packets to the server at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges). If neither connection payload packets nor connection keep-alive packets are received from the server within the timeout period specified in the connect token, the client transitions to the connection timed out state.

While in the connected state, if a client receives a connection disconnect packet from the server, the client transitions to the disconnected state. If a client wants to disconnect from a server, the client sends several (e.g., 1-10) redundant connection disconnect packets before transitioning to the disconnected state.

The preceding discussion related to the netcode.io implementation relates primarily to the client-side of the inventive subject matter. The following discussion is related primarily to the server-side of the inventive subject matter.

To begin, the dedicated server (which is interchangeably referred to as "server," "dedicated server," or "dedicated server instance") must be on a publicly accessible IP address and port. The server manages a set of n client slots, where each slot from ranging from 0 to n−1 represents room for one connected client. The maximum number of client slots per server is implementation specific. Typical uses cases are expected in the range of 2 to 64 but support for up to 256 clients per server is contemplated. The upper bound for client slots on a server is limited by the efficiency of a particular implementation of the protocol.

Dedicated servers in the netcode.io implementation are required to follow strict rules when processing connection requests. First, clients must have a valid connect token to connect to a server. Second, a server responds to a client only when absolutely necessary. Third, servers ignore any malformed request as soon as possible, with a minimum amount of work. And finally, servers ensure response packets (e.g., response packets of any type) are smaller than request packets to avoid DDoS amplification (e.g., where request packets and response packets are in pairs, it is required that response packets are smaller than their corresponding request packets).

When a server receives a connection request packet from a client it contains the following data: (1) a prefix byte of zero (e.g., uint8); (2) version information (e.g., 13 bytes containing, "'NETCODE 1.00' ASCII with null terminator"); (4) protocol ID (e.g., 8 bytes); connect token expire timestamp (e.g., 8 bytes); (5) connect token sequence number (e.g., 8 bytes); and (6) encrypted private connect token data (e.g., 1024 bytes).

Connection request packets are not encrypted. Only a dedicated server instance and the web backend can read encrypted private connect token data, because it is encrypted with a private key shared between the dedicated server instance and the web backend. In the netcode.io implementation, important contents of a connection request packet, for example, version info, protocol ID, and connect token expiration timestamp are protected by the AEAD construct, and thus cannot be modified without failing a signature check.

When processing a connection request packet, a server undertakes a sequence of steps. In the netcode.io implementation, the steps described in the following paragraph a preferably completed in order, but it is contemplated that the steps can be completed in a different order, and, in some embodiments, steps can be skipped. Steps 1 through 10 are illustrated in FIG. 16.

First, if the connection request packet is not the expected size (e.g., 1062 bytes) the server ignores the packet. Second, if the version info in the connection request packet doesn't match "NETCODE 1.00" (13 bytes, with null terminator), the server ignores the packet. Third, if the protocol ID in the connection request packet doesn't match the expected protocol ID of the dedicated server, the server ignores the packet. Fourth, if the connect token expiration timestamp in the connection request packet is less than or equal to the current timestamp, the server ignores the packet. Fifth, if the encrypted private connect token data in the connection request packet doesn't decrypt with the private key using associated data constructed from a combination of some or all of version information, protocol ID, and expiration timestamp, the server ignores the packet.

Sixth, if the decrypted private connect token in the connection request packet fails to be read for any reason, the server ignores the packet. For example, the server ignores the connection request packet if the private connect token has one or more server addressed outside of the expected range of 1 to 32, or if it has an address type value outside of range 0 to 1. Seventh, if the dedicated server public address is not in the list of server addresses in the private connect token in the connection request packet, the server ignores the packet. Eighth, if a client from the connection request packets IP source address and port is already connected, ignore the packet. Ninth, if a client having a client ID contained in the private connect token data of the connection request packet is already connected, the server ignores the packet. Tenth, if the connect token in the connection request packet has already been used by a different packet source IP address and port, the server ignores the packet. Otherwise, the server adds the private connect token HMAC and packet source IP address and port to the history of connect tokens already used.

Eleventh, if no client slots are available on the server (indicating the server is full), the server responds with a connection denied packet. Twelfth, the server adds an encryption mapping for the packet source IP address and port so that packets read from that address and port are decrypted with the client to server key in the private connect token, and packets sent to that address and port are encrypted with the server to client key in the private connect token. This encryption mapping expires after some number of seconds where no packets being sent to or received from that address and port (e.g., after timing out, where a timeout can occur after, for example, 1-5 s, 5-10 s, or 10-20 s), or if a client fails to establish a connection with the server before timing out.

The next steps—beginning with thirteen—are shown in FIG. 17, and are a continuation of the preceding steps. Thirteenth, if for some reason encryption mapping cannot be added, the server ignores the packet. And finally, in the absence of any of the preceding conditions being met, the server responds with a connection challenge packet and increments the connection challenge sequence number.

Next, connection response packets must be processed. When the client receives a connection challenge packet from the server, the client responds with a connection response packet (as shown in FIG. 5), which, in some embodiments, contains: (1) a prefix byte (uint8) (e.g., a non-zero prefix byte: ((num_sequence_bytes<<4) I packet_type)); (2) a sequence number (e.g., having a variable length of 1-8 bytes); (3) a challenge token sequence (uint64); (4) an encrypted challenge token data (e.g., 360 bytes).

It is then contemplated that a server can take several steps when processing a connection response packet, as shown in FIG. 18. In some embodiments, a server completes the following steps, in order. It is contemplated that the server can cease to carry out steps: (1) if the encrypted challenge token data fails to decrypt, the server ignores the packet; (2) if a client from the packet source address and port is already connected, the server ignores the packet; (3) if a client with the client ID contained in the encrypted challenge token data is already connected, the server ignores the packet; (4) if no client slots are available (e.g., the server is full), the server responds with a connection denied packet; (5) the server assigns the packet IP address, port, and client ID to a free client slot and marks that client as connected; (6) the server copies the user data from the challenge token into a client slot so the user data is accessible to a server application; (7) the server sets the confirmed flag for that client slot to false; (8) finally, the server responds with a connection keep-alive packet.

Once a client is assigned to a slot on the server, it is considered logically connected. The index of the slot is used to identify clients on the server and is called the client index. Packets (e.g., connection keep-alive packets, connection payload packets, and connection disconnect packets) received by the server from that client's address and port are mapped to that client index and processed in the context of that client.

To ensure delivery of payload data from client to server as netcode.io packets, the server buffers connection payload packets received from connected clients. In some embodiments, the server (e.g., a server application) can send connection payload packets to connected clients.

In the absence of connection payload packets sent to a client, the server generates and sends connection keep-alive packets to that client at some rate (e.g., 5-10 Hz, 10-15 Hz, 15-20 Hz, 20-30 Hz, 30-40 Hz, 40-50 Hz, 50-60 Hz, 60-120 Hz or a variable rate within one, or some combination of, those ranges).

While the confirmed flag for a client slot is false, each connection payload packet sent to that client is preceded by (e.g., prefixed with) a connection keep-alive packet. This communicates the client index and the max clients to that client, which it needs to transition to a fully connected state.

In some instances, a server can receive a connection payload packet or a connection keep-alive packet from an unconfirmed client. When this occurs, the server sets the confirmed flag for that client slot to true and ceases prefixing connection payload packets with connection keep-alive packets.

For a server to disconnect a client, the server sends a number of redundant connection disconnect packets to that client before resetting that client's client slot. If neither a connection payload packet nor a connection keep-alive packet is received from a client within timeout period specified in a connect token, or if the server receives a connection disconnect packet from a client, then the client slot is reset and becomes available for other clients to connect to. Disconnection is illustrated in FIG. 8a-8b.

The inventor contemplates that the netcode.io implementation of the inventive subject matter can incorporate asymmetric cryptography as discussed earlier in this application where a shared private key is replaced by a private/public key pair per-server, and a private/public key pair on the web backend, and encrypting connect tokens for specific servers using the private key of the web backend and the public key of that server.

The inventive subject matter described in this application improves the functioning of client-server networking communications by reducing complexity, increasing security, and enabling an entire new generation of web-based game development.

Specific methods of network communication using UDP have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular, the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of establishing a network connection between a client and a server to facilitate multiplayer gaming, comprising:
receiving, from the client, a connection request packet comprising a connect token, wherein the connect token is generated by a web backend and subsequently sent to the client;
verifying validity of the connect token;
determining whether a client connection slot is available;
sending, to the client, a connection challenge packet;
receiving, from the client, a connection response packet;
verifying that the client connection slot remains available; and
establishing the network connection with the client.

2. The method of claim 1, wherein the connect token comprises (1) private data that is encrypted and signed by a shared private key and (2) public data, wherein portions of the public data are signed by the shared private key.

3. The method of claim 2, wherein:
the public data comprises at least one of: (1) encryption keys for payload packets exchanged between the client and the server, and (2) a list of server addresses; and
the private data comprises: (1) information to verify the client is authenticated by the web backend and (2) symmetric encryption keys used by the client and the server to exchange encrypted and signed payload packets.

4. The method of claim 3, wherein the step of verifying validity of the connect token further comprises checking:
an expiration timestamp of the connect token;
that the private data and the public data in the connect token are signed by the shared private key;
that the server is in a whitelist of server addresses included in the private data; and
that the connect token has not already been used on the server.

5. The method of claim 1, wherein the connect token comprises (1) private data that is encrypted and signed by a web backend private key and a server public key and (2) public data, wherein portions of the public data are signed by the web backend private key and a server public key.

6. The method of claim 5, wherein:
the public data comprises at least one of: (1) encryption keys for payload packets exchanged between the client and the server, and (2) a list of server addresses; and
the private data comprises: (1) information to verify the client is authenticated by the web backend, (2) symmetric encryption keys used by the client and the server to exchange encrypted and signed payload packets.

7. The method of claim 6, wherein the step of verifying validity of the connect token further comprises testing:
the connect token has not expired;
the private data and the public data in the connect token are signed by the web backend private key and the server public key, via asymmetric encryption; and
the connect token has not already been used on the server.

8. The method of claim 1, wherein the connection challenge packet comprises a challenge token, wherein the challenge token: (1) comprises data relevant to the network connection and (2) is encrypted with a random key rolled when the server started.

9. The method of claim 1, wherein the connection challenge packet is smaller than the connection request packet to eliminate a possibility of a DDoS attack.

10. The method of claim 1, further comprising the step of setting the client connection slot into an unconfirmed state after receiving the connection response packet from the client.

11. The method of claim 1, further comprising the step of authenticating the client.

12. The method of claim 1, further comprising the step of sending connection payload packets after establishing the connection with the client.

* * * * *